United States Patent
Babin et al.

(10) Patent No.: US 9,430,813 B2
(45) Date of Patent: Aug. 30, 2016

(54) TARGET IMAGE GENERATION UTILIZING A FUNCTIONAL BASED ON FUNCTIONS OF INFORMATION FROM OTHER IMAGES

(71) Applicant: LSI Corporation, San Jose, CA (US)

(72) Inventors: Dmitry N. Babin, Moscow (RU); Alexander A. Petyushko, Moscow (RU); Ivan L. Mazurenko, Moscow (RU); Alexander B. Kholodenko, Moscow (RU); Aleksey A. Letunovskiy, Moscow (RU)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 199 days.

(21) Appl. No.: 14/235,993

(22) PCT Filed: Aug. 26, 2013

(86) PCT No.: PCT/US2013/056618
§ 371 (c)(1),
(2) Date: Jan. 29, 2014

(87) PCT Pub. No.: WO2014/105219
PCT Pub. Date: Jul. 3, 2014

(65) Prior Publication Data
US 2015/0356708 A1    Dec. 10, 2015

(30) Foreign Application Priority Data
Dec. 24, 2012    (RU) ................................ 2012156158

(51) Int. Cl.
G06K 9/36    (2006.01)
G06T 3/40   (2006.01)
(Continued)

(52) U.S. Cl.
CPC ............ *G06T 3/4007* (2013.01); *G06F 3/017* (2013.01); *G06T 5/20* (2013.01); *G06T 5/50* (2013.01);
(Continued)

(58) Field of Classification Search
None
See application file for complete search history.

(56) References Cited

U.S. PATENT DOCUMENTS 6,509,902 B1    1/2003    Pfister et al.
8,310,233 B2    11/2012   Trzasko et al.
(Continued)

FOREIGN PATENT DOCUMENTS

WO  PCT/US2013/056618    3/2014

OTHER PUBLICATIONS

N. Nguyen et al., "A Computationally Efficient Superresolution Image Reconstruction Algorithm," IEEE Transactions on Image Processing, Apr. 2001, pp. 573-583, vol. 10, No. 4.
(Continued)

*Primary Examiner* — Li Liu

(57) ABSTRACT

An image processing system comprises an image processor configured to construct a designated functional based on a plurality of functions each associated with a corresponding portion of image information relating to at least first and second images, and to generate a target image utilizing the constructed functional. For example, the functions may comprise a set of functions $f_1(A_1), f_1(A_1), \ldots, f_1(A_1)$ of pixels from respective input images $A_1, A_2, A_L$ of the image information, and the functional may be a function $F(X)$ of the set of functions $f_1(A_1), f_2(A_L), f_L(A_L)$ where $X$ denotes the target image and is generated by minimizing the functional $F(X)$. The input images may be received from one or more image sources and the target image may be provided to one or more image destinations.

20 Claims, 3 Drawing Sheets

(51) Int. Cl.
*G06T 5/20* (2006.01)
*G06F 3/01* (2006.01)
*G06T 5/50* (2006.01)

(52) U.S. Cl.
CPC .............. *G06T 2207/10024* (2013.01); *G06T 2207/10028* (2013.01); *G06T 2207/10048* (2013.01); *G06T 2207/20028* (2013.01)

(56) References Cited

U.S. PATENT DOCUMENTS

| | | | |
|---|---|---|---|
| 8,675,999 B1* | 3/2014 | Liang et al. | 382/299 |
| 2002/0131650 A1 | 9/2002 | Rodet et al. | |
| 2006/0147097 A1 | 7/2006 | Grangeat et al. | |
| 2007/0019887 A1* | 1/2007 | Nestares et al. | 382/299 |
| 2007/0104393 A1* | 5/2007 | Strelow | 382/299 |
| 2008/0219581 A1 | 9/2008 | Albu et al. | |
| 2009/0010507 A1* | 1/2009 | Geng | 382/128 |
| 2010/0220911 A1 | 9/2010 | Bertens et al. | |
| 2011/0028183 A1 | 2/2011 | Yun | |
| 2011/0085714 A1* | 4/2011 | Yan et al. | 382/128 |
| 2011/0205381 A1* | 8/2011 | Vranceanu et al. | 348/217.1 |
| 2011/0242126 A1 | 10/2011 | Hoppe et al. | |
| 2012/0049088 A1 | 3/2012 | Klose | |
| 2012/0200694 A1* | 8/2012 | Garsha et al. | 348/79 |
| 2012/0314104 A1* | 12/2012 | Nishiyama | 348/241 |
| 2013/0129213 A1* | 5/2013 | Shechtman et al. | 382/167 |
| 2013/0301906 A1* | 11/2013 | Yoon et al. | 382/154 |

OTHER PUBLICATIONS

B. Bartczak et al., "Dense Depth Maps from Low Resolution Time-of-Flight Depth and High Resolution Color," Proceedings of the 5th International Symposium on Advances in Visual Computing (ISVC), Part II, Nov.-Dec. 2009, pp. 228-239.

J. Diebel et al., "An Application of Markov Random Fields to Range Sensing," Advances in Neural Information Processing Systems (NIPS), Dec. 2005, pp. 291-298, Vancouver, British Columbia, Canada.

N. Cvejic et al., "A Novel Metric for Performance Evaluation of Image Fusion Algorithms," Proceedings of World Academy of Science, Engineering and Technology (PWASET), Aug. 2005, pp. 80-85, vol. 7.

Q. Yang et al., "Spatial-Depth Super Resolution for Range Images," IEEE Conference on Computer Vision and Pattern Recognition (CVPR), Jun. 2007, 8 pages.

D. Mueller et al., "The Generalised Image Fusion Toolkit (GIFT), Release 4.0," Workshop on Open Source and Data for Medical Image Computing and Computer-Assisted Intervention (MICCAI), Sep. 2006, 17 pages, Copenhagen, Denmark.

* cited by examiner

TARGET IMAGE GENERATION UTILIZING A FUNCTIONAL BASED ON FUNCTIONS OF INFORMATION FROM OTHER IMAGES

FIELD

The field relates generally to image processing, and more particularly to image reconstruction and other processes involving generation of a given target image utilizing information relating to other images.

BACKGROUND

Image processing is important in a wide variety of different applications, and such processing may involve multiple images of different types, including two-dimensional (2D) images and three-dimensional (3D) images. For example, a 3D image of a spatial scene may be generated using triangulation based on multiple 2D images captured by respective cameras arranged such that each camera has a different view of the scene. Alternatively, a 3D image can be generated directly using a depth imager such as a structured light (SL) camera or a time of flight (ToF) camera. Multiple images of these and other types may be processed in machine vision applications such as gesture recognition, face detection and singular or multiple person tracking.

Conventional image processing techniques include various image reconstruction techniques such as interpolation and super resolution. Interpolation is typically used when information is available for only a portion of a given image. Super resolution techniques may be used, for example, to enhance the resolution of a low-resolution image using another image of higher resolution. Exemplary super resolution techniques may be based on Markov random fields or bilateral filters.

SUMMARY

In one embodiment, an image processing system comprises an image processor configured to construct a designated functional based on a plurality of functions each associated with a corresponding portion of image information relating to at least first and second images, and to generate a target image utilizing the constructed functional. The input images may be received from one or more image sources and the target image may be provided to one or more image destinations. By way of example only, the plurality of functions may comprise a set of functions $f_1(A_1), f_2(A_2), \ldots, f_L(A_L)$ each comprising a function of pixels from a corresponding one of a plurality of input images $A_1, A_2, \ldots, A_L$ of the image information, and the functional may be a function of the set of functions $f_1(A_1), f_2(A_2), \ldots, f_L(A_L)$. The functional may be of the form $F(X)$ where $X$ denotes the target image and in such an arrangement the target image $X$ may be generated by minimizing the functional $F(X)$.

Other embodiments of the invention include but are not limited to methods, apparatus, systems, processing devices, integrated circuits, and computer-readable storage media having computer program code embodied therein.

DETAILED DESCRIPTION

Embodiments of the invention will be illustrated herein in conjunction with exemplary image processing systems that include image processors or other types of processing devices and implement techniques for generating a target image utilizing a functional based on functions of information from other images. It should be understood, however, that embodiments of the invention are more generally applicable to any image processing system or associated device or technique in which it is desirable to generate a target image using information from multiple other images.

Figure 1:
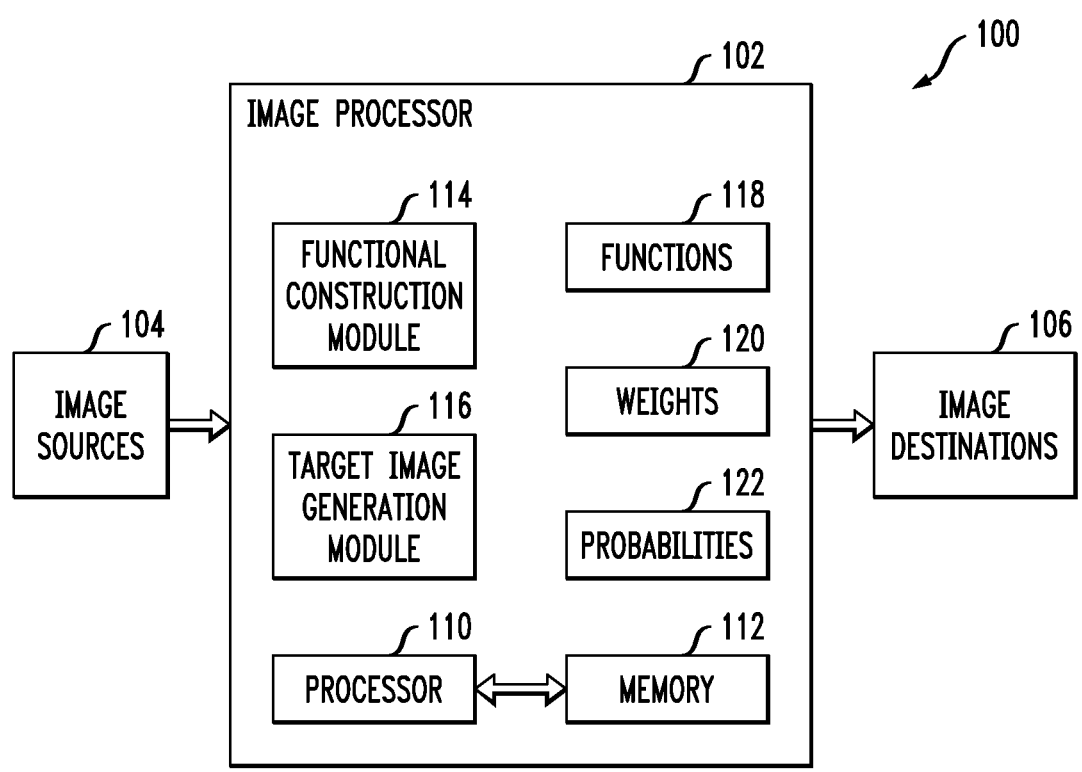
FIG. 1 is a block diagram of an image processing system in one embodiment.

FIG. 1 shows an image processing system 100 in an embodiment of the invention. The image processing system 100 comprises an image processor 102 that receives images from image sources 104 and provides processed images to image destinations 106.

The image sources 104 comprise, for example, 3D imagers such as SL and ToF cameras as well as one or more 2D imagers such as 2D imagers configured to generate 2D infrared images, gray scale images, color images or other types of 2D images, in any combination. Another example of one of the image sources 104 is a storage device or server that provides images to the image processor 102 for processing.

The image destinations 106 illustratively comprise, for example, one or more display screens of a human-machine interface, or at least one storage device or server that receives processed images from the image processor 102.

Although shown as being separate from the image sources 104 and image destinations 106 in the present embodiment, the image processor 102 may be at least partially combined with one or more image sources or image destinations on a common processing device. Thus, for example, one or more of the image sources 104 and the image processor 102 may be collectively implemented on the same processing device. Similarly, one or more of the image destinations 106 and the image processor 102 may be collectively implemented on the same processing device.

In one embodiment the image processing system 100 is implemented as a video gaming system or other type of gesture-based system that processes images in order to recognize user gestures. The disclosed techniques can be similarly adapted for use in a wide variety of other systems requiring a gesture-based human-machine interface, and can also be applied to applications other than gesture recognition, such as machine vision systems in robotics and other industrial applications.

The image processor 102 in the present embodiment is implemented using at least one processing device and comprises a processor 110 coupled to a memory 112. Also included in the image processor 102 are a functional construction module 114 and a target image generation module 116.

The functional construction module 114 is configured to construct a designated functional based on a plurality of functions each associated with a corresponding portion of image information relating to at least first and second images. The term "functional" as used herein is intended to encompass, for example, a function of multiple functions.

More generally, the functional may be viewed as providing a mapping from a vector space into its underlying scalar field, where the vector space may be a space of functions. The term "image information" as used herein is intended to be broadly construed so as to encompass the first and second images themselves, portions of these images, or information derived from at least portions of these images.

The first and second images or other image information derived therefrom may be provided by one or more of the image sources 104. For example, first and second image sources may provide respective first and second images to the image processor 102 such that the image processor can derive image information from those first and second images. Alternatively, the sources may derive information from respective images and provide the derived information to the image processor 102. As another example, a single image source can provide multiple images or associated derived information to the image processor 102.

The target image generation module 116 is configured to generate a target image utilizing the constructed functional. The resulting target image in the system 100 is provided to one or more of the image destinations 106.

The particular functions used to construct the functional in module 114 in the present embodiment comprise one or more sets of functions selected or otherwise obtained from functions 118 of the image processor 102. For example, in processes to be described below in conjunction with FIGS. 2 and 3, the functions used to construct the functional in module 114 comprise a set of functions $f_1(A_1)$, $f_2(A_2), \ldots, f_L(A_L)$ each comprising a function of pixels from a corresponding one of a plurality of input images $A_1$, $A_2, \ldots, A_L$ of the above-noted image information. Thus, in such an arrangement, the functional is a function of the set of functions $f_1(A_1), f_2(A_2), \ldots, f_L(A_L)$. However, other types of functions may be used to construct a functional in other embodiments.

The functional constructed in functional construction module 114 may be of the form F(X) where X denotes the target image. The target image generation module 116 may be configured to generate the target image X by minimizing the functional F(X). This may involve, for example, solution of a set of linear equations as in the FIG. 2 process, or approximate iterative minimization as in the FIG. 3 process. The functional F(X) may incorporate one or more of a set of weights and a set of probabilities, with the sets being selected or otherwise obtained from respective weights 120 and probabilities 122 of the image processor 102. Other embodiments may use numerous other types and configurations of functionals and associated techniques for generating target images utilizing the functionals.

The multiple images utilized in the image processing system 100 to determine a given target image may comprise various combinations of depth images and non-depth images. As one example, the first image may comprise a depth image of a first resolution from a first one of the image sources 104 and the second image may comprise a 2D image of substantially the same scene and having a resolution substantially the same as the first resolution from another one of the image sources 104 different than the first image source. In an embodiment of this type, the first image source may comprise a 3D image source such as a structured light or ToF camera, and the second image source may comprise a 2D image source configured to generate the second image as an infrared image, a gray scale image or a color image. As indicated above, in other embodiments the same image source supplies both the first and second images. Also, more than first and second images may be used.

It should be noted that the terms "construction" in the context of functional construction module 114 and "generation" in the context of target image generation module 116 are intended to be broadly construed so as to encompass a wide variety of different techniques for determining a functional and a target image, respectively.

As mentioned previously, exemplary image processing operations implemented using functional construction module 114 and target image generation module 116 of image processor 102 will be described in greater detail below in conjunction with FIGS. 2 and 3.

The processor 110 and memory 112 in the FIG. 1 embodiment may comprise respective portions of at least one processing device comprising a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of image processing circuitry, in any combination.

The functional construction module 114 and the target image generation module 116 or portions thereof may be implemented at least in part in the form of software that is stored in memory 112 and executed by processor 110. A given such memory that stores software code for execution by a corresponding processor is an example of what is more generally referred to herein as a computer-readable medium or other type of computer program product having computer program code embodied therein, and may comprise, for example, electronic memory such as random access memory (RAM) or read-only memory (ROM), magnetic memory, optical memory, or other types of storage devices in any combination. The memory 112 may additionally or alternatively store at least a portion of one or more of functions 118, weights 120 and probabilities 122. As indicated above, the processor 110 may comprise portions or combinations of a microprocessor, ASIC, FPGA, CPU, ALU, DSP or other image processing circuitry.

It should also be appreciated that embodiments of the invention may be implemented in the form of integrated circuits. In a given such integrated circuit implementation, identical die are typically formed in a repeated pattern on a surface of a semiconductor wafer. Each die includes image processing circuitry as described herein, and may include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

The particular configuration of image processing system 100 as shown in FIG. 1 is exemplary only, and the system 100 in other embodiments may include other elements in addition to or in place of those specifically shown, including one or more elements of a type commonly found in a conventional implementation of such a system.

The operation of the image processor 102 in illustrative embodiments will now be described in greater detail. It is assumed for these embodiments that the target image X is an unknown image of size M×N pixels that is to be reconstructed by the image processor 102 from image information relating to multiple input images $A_1, A_2, \ldots, A_L$ provided by one or more of the image sources 104. One or more of the input images $A_1, A_2, \ldots, A_L$ may each also be of the same size M×N pixels as the desired target image. The input images may be taken from the same or similar viewpoints of a scene possibly by different imagers or other types of image sources.

The above-noted set of functions $f_1(A_1)$, $f_2(A_2)$, ..., $f_L(A_L)$ may be configured to provide respective known mappings $R^{M \times N} \rightarrow R$ of pixel values from images $A_1$, $A_2$, ..., $A_L$ where $R^{M \times N}$ is a set of real M×N matrices. Examples of such mappings will be described in greater detail elsewhere herein.

The image processor 102 in the present embodiment is configured to reconstruct the target image X using the functional F(X) based on the set of functions $f_1(A_1)$, $f_2(A_2)$, ..., $f_L(A_L)$ selected or otherwise obtained from functions 118, so that reconstructed pixel values $X_{ij}$ of X, where 1≤i≤M, 1≤j≤N, are optimal in a specified sense relative to other possible X values. The term "optimal" as used herein is intended to be broadly construed, encompassing optimization in accordance with one or more specified optimization rules, and should not be viewed as requiring an absolute minimization.

The functional F(X) in some embodiments is of the following form:

$$F(X) = \sum_{k=1}^{L} (f_k(X) - f_k(A_k))^2. \quad (1)$$

As indicated previously, in some embodiments, the target image X is the image that minimizes the functional F(X), i.e.

$$X = \underset{X}{\mathrm{argmin}} \sum_{k=1}^{L} (f_k(X) - f_k(A_k))^2 \quad (2)$$

Weights selected or otherwise obtained from weights 120 may be used to designate certain input images as being more important than others in the determination of the target image. For example, a set of weights $w_1, \ldots, w_L$ may be introduced such that $w_k > 0$ for all k=1 ... L. If it is known that the information provided by a given one of the functions $f_j(A_j)$ is more important than the information provided by another one of the functions $f_i(A_i)$, where in this particular context the indices i and j are defined such that 1≤i≤L, 1≤j≤L, then the weights may be assigned such that $w_j \geq w_i$.

The functional (1) above as modified to include weights is given by:

$$F(X) = \sum_{k=1}^{L} w_k (f_k(X) - f_k(A_k))^2 \quad (1')$$

In this case, the target image X can be found using the following minimization:

$$X = \underset{X}{\mathrm{argmin}} \sum_{k=1}^{L} w_k (f_k(X) - f_k(A_k))^2 \quad (2')$$

If it is not known which input images are more important than others, all of the weights may be set equal to unity, $w_1 = \ldots = w_L = 1$. This reduces functional (1') to functional (1) and reduces minimization (2') to minimization (2).

Probabilities from probability sets 122 may also be used, in conjunction with or in place of the above-described weights. For example, a set of probabilities $p_1, p_2, \ldots, p_L$ may be introduced, where $0 \leq p_k \leq 1$ for all k=1 ... L. A given one of these probability values $p_k$ can be considered a reliability measure of the corresponding portion of the input image information. The greater the probability, the greater the contribution should be from the corresponding term in the functional.

The functional (1') above as modified to include probabilities is given by:

$$F(X) = \sum_{k=1}^{L} w_k p_k (f_k(X) - f_k(A_k))^2 \quad (1'')$$

In this case, the target image X can be found using the following minimization:

$$X = \underset{X}{\mathrm{argmin}} \sum_{k=1}^{L} w_k p_k (f_k(X) - f_k(A_k))^2 \quad (2'')$$

If the probabilities are not known, all of the probabilities may be set equal to unity, $p_1 = \ldots = p_L = 1$. This reduces functional (1'') to functional (1') and reduces minimization (2'') to minimization (2').

In the foregoing, the particular functions, weights and probabilities used in a given functional are assumed to be selected or otherwise obtained from the respective functions 118, weights 120 and probabilities 122 of image processor 102. The image processor may therefore store multiple sets of functions, weights and probabilities and select particular sets for use a given image processing application as needed. Alternatively, one or more such sets may be generated as needed by the image processor.

The manner in which the minimizations (2), (2') or (2'') are used to determine the target image X will now be described in greater detail. Two cases will be considered, a first case in which the functions $f_1(A_1)$, $f_2(A_2)$, ..., $f_L(A_L)$ are all linear functions, and a second case in which at least one of the functions $f_1(A_1)$, $f_2(A_2)$, ..., $f_L(A_L)$ is a non-linear function.

In the first case, it is more particularly assumed that all of the functions $f_1(A_1)$, $f_2(A_2)$, ..., $f_L(A_L)$ are linear in their respective essential variables, where the essential variables of $f(X)$ are denoted $v(f(X))$. For example, $v(x_{i,j+1} - x_{i,j}) = \{x_{i,j+1}, x_{ij}\}$. Also, $V(F) = \cup_{k=1}^{L} v(f_k(X))$ denotes the set of all essential variables of F(X). In order to avoid ambiguity in determining X, it is further assumed that $V(F) = \cup_{k=1}^{L} v(f_k(X)) = \{x_{1,1}, x_{1,2}, \ldots, x_{1,N}, x_{2,1}, \ldots, x_{M,N}\}$, i.e., all variables are essential to the functional F(X).

The target image X can be determined in this case of linear functions by solving a system of linear equations comprising:

$$dF/dx_{ij} = 0, \text{ for all } 1 \leq i \leq M, 1 \leq j \leq N \quad (3)$$

The system of linear equations (3) is a system of MN linear equations that can be solved exactly or approximately using any of a number of well-known techniques, such as, for example, Gaussian elimination.

In the second case, at least one of the functions $f_1(A_1)$, $f_2(A_2)$, ..., $f_L(A_L)$ is a non-linear function, and thus X cannot be found by solving a system of linear equations as in the first case above. Instead, one possible technique for determining the target image X is based on an approximate iterative minimization:

$$X_{i+1} = \text{app\_min}(F, X_i). \quad (4)$$

which starts with an initial approximation $X_0$ of the target image X and works iteratively until a maximum number of iterations is met or a difference between approximations $X_{i+1}$ and $X_i$ of the target image X in two consecutive iterations is smaller than a threshold.

The initial approximation $X_0$ may be determined utilizing a set of q identity functions $f_{i1}(A_{i1}), f_{i2}(A_{i2}), \ldots, f_{iq}(A_{iq})$ each of which provides partial information regarding the target image X. For example, the identity functions may each provide at least one pixel value $f_{i1}(A_{i1})=a_{m1,n1}$, $f_{i2}(A_{i2})=a_{m2,n2}, \ldots, f_{iq}(A_{iq})=a_{mq,nq}$, in which case the initial approximation $X_0$ may be an M×N approximation determined by interpolation using at least the q values $a_{m1,n1}$, $a_{m2,n2}, \ldots, a_{mq,nq}$. As a more particular example, the q values may comprise a regular sublattice of an M×N lattice such that bilinear interpolation, cubic interpolation or other types of interpolation may be used to determine $X_0$.

Although this approach utilizes MN variables and can therefore be computationally intensive, the approximation can be sped up through the use of additional information such as gradients in an analytical form. Thus, for example, it may be assumed that the gradients are known for all variables. Examples of processes that can be used include gradient decent, trust region, Levenberg-Marquardt, etc.

Figure 2:
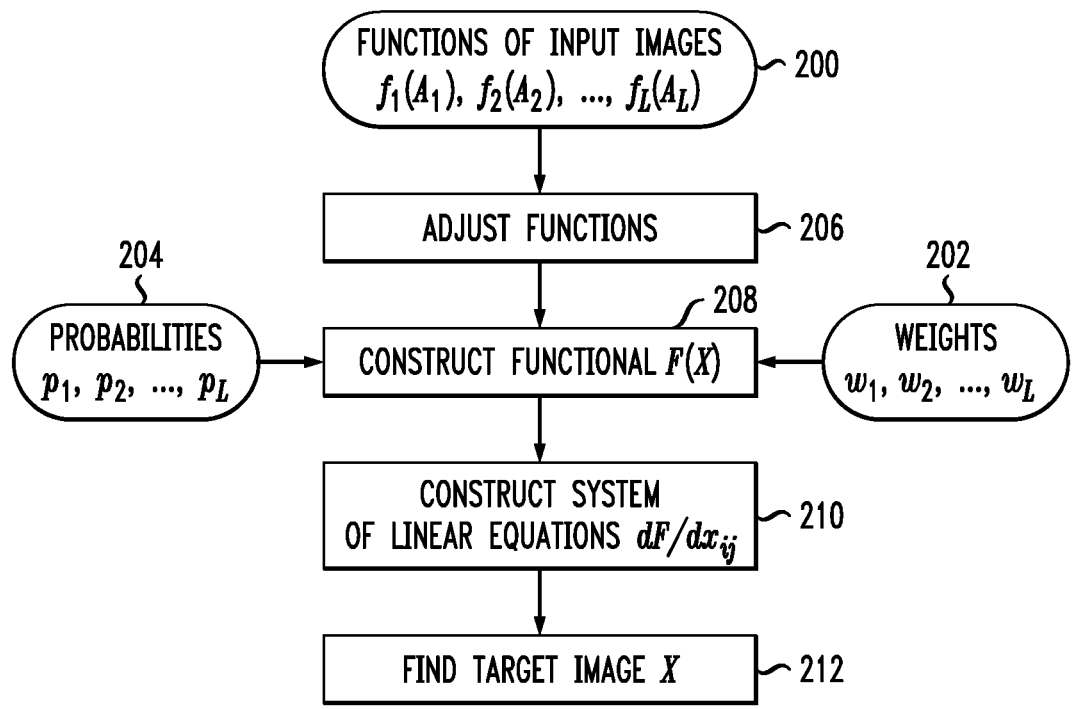
FIG. 2 is a flow diagram of a process for generating a target image using a system of linear equations in the FIG. 1 system.

Referring now to the flow diagram of FIG. 2, a process is shown for generation of a target image using a system of linear equations in one embodiment. The process is assumed to be implemented by the image processor 102 using its functional construction module 114 and target image generation module 116.

The process in this embodiment includes steps 200 through 212, and begins with obtaining a set of functions $f_1(A_1), f_2(A_2), \ldots, f_L(A_L)$ of respective input images $A_1, A_2, \ldots, A_L$ in step 200, a set of weights $w_1, \ldots, w_L$ in step 202, and a set of probabilities $p_1, p_2, \ldots, p_L$ in step 204. If weights or probabilities will not be applied, the corresponding values can all be set to unity.

In step 206, the functions obtained in step 200 are adjusted if necessary. For example, the functions can relate to respective images from different image sources, and therefore normalization may be required. As a more particular example, in an implementation in which the functions comprise respective image gradients, an image gradient for an input image from one source can be in a range [0 . . . 1], while an image gradient for an input image from another source is in a different range [−1 . . . 1], and an image gradient for an input image from yet another source is in a third range [1 . . . 1000]. In these and other similar situations, the adjustment in step 206 is used to normalize the image gradient values, for example, by multiplying them by appropriate normalizing coefficients.

In step 208, the functional F(X) is constructed in the manner described previously. For example, assuming that both weights and probabilities will be used, the functional F(X) may be constructed in the form (1″).

In step 210, the system of linear equations $dF/dx_{i,j}$ is constructed. It is assumed for this embodiment that the functions $f_1(A_1), f_2(A_2), \ldots, f_L(A_L)$ are linear functions of their respective essential variables as described previously. This step therefore generally involves differencing F(X) by all M×N variables $x_{i,j}$, i=1 . . . M, j=1 . . . N, in order to obtain the system of linear equations (3) given above.

In step 212, the target image X is determined by solving the system of linear equations using an approach such as Gaussian elimination.

Figure 3:
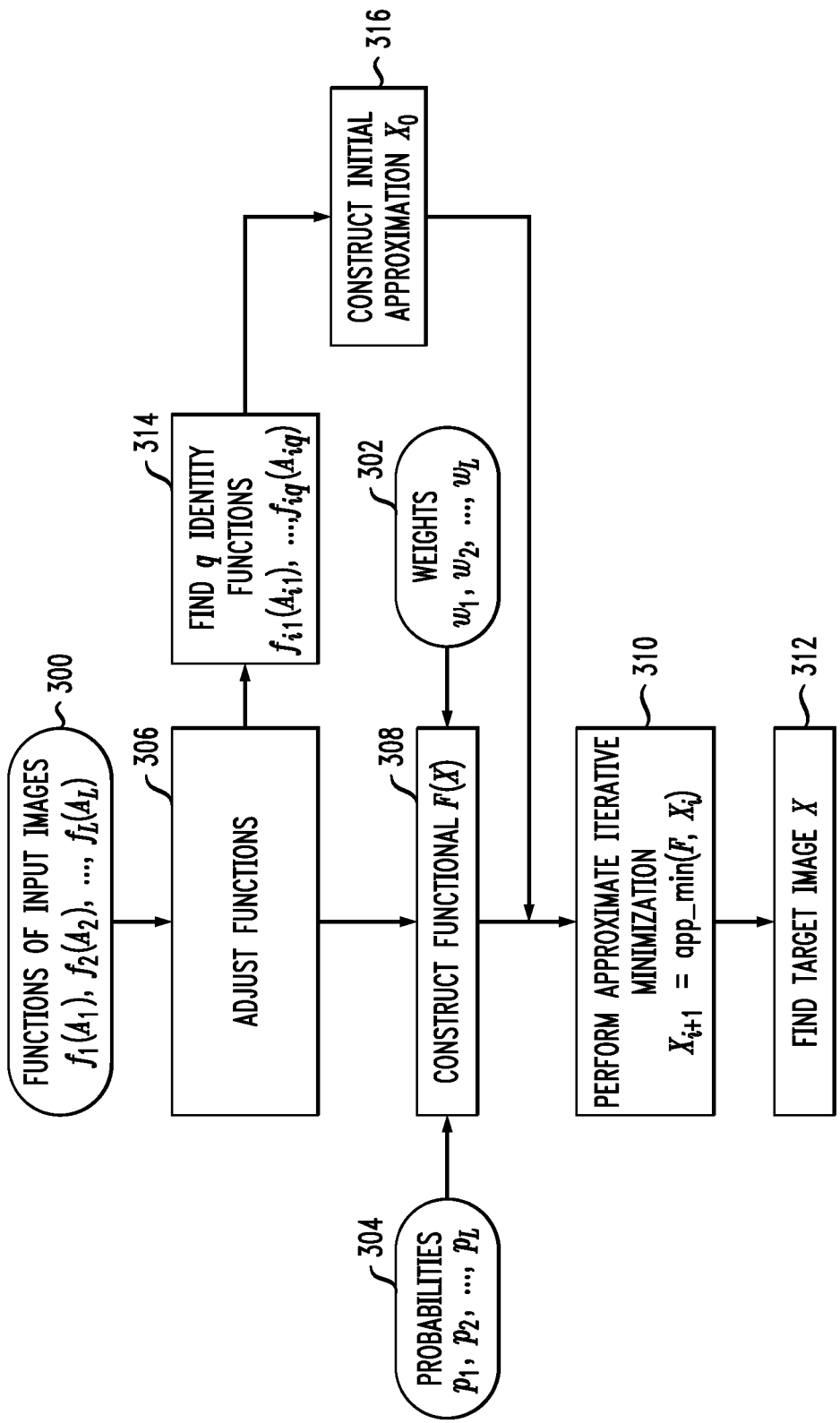
FIG. 3 is a flow diagram of a process for generating a target image using approximate iterative minimization in the FIG. 1 system.

FIG. 3 illustrates a process for generation of a target image using approximate iterative minimization in one embodiment. Like the FIG. 2 process, the FIG. 3 process is assumed to be implemented by the image processor 102 using its functional construction module 114 and target image generation module 116. Also, steps 300 through 312 of FIG. 3 correspond generally to respective steps 200 through 212 of FIG. 2.

The process in this embodiment begins with obtaining a set of functions $f_1(A_1), f_2(A_2), \ldots, f_L(A_L)$ of respective input images $A_1, A_2, \ldots, A_L$ in step 300, a set of weights $w_1, \ldots, w_L$ in step 302, and a set of probabilities $p_1, p_2, \ldots, p_L$ in step 304. If weights or probabilities will not be applied, the corresponding values can all be set to unity.

In step 306, the functions obtained in step 300 are adjusted if necessary, in the manner previously described in the context of FIG. 2.

In step 308, the functional F(X) is constructed, also in the manner described previously. For example, assuming that both weights and probabilities will be used, the functional F(X) may be constructed in the form (1″).

In step 310, approximate iterative minimization (4) is performed. As indicated above, this approximate iterative minimization starts with an initial approximation $X_0$ of the target image X and works iteratively until a maximum number of iterations is met or a difference between approximations $X_{i+1}$ and $X_i$ of the target image X in two consecutive iterations is smaller than a threshold.

In step 312, the target image X is determined based on an output of the approximate iterative minimization of step 310. More particularly, as indicated above, the approximate iterative minimization process is terminated based on a maximum number of iterations being reached or a threshold difference between the target image approximations for two consecutive iterations being met.

The FIG. 3 process further includes additional steps 314 and 316 that relate to determining the initial approximation $X_0$ to be utilized in the approximate iterative minimization in step 310.

In step 314, a set of q identity functions $f_{i1}(A_{i1})$, $f_{i2}(A_{i2}), \ldots, f_{iq}(A_{iq})$ are determined, each of which provides partial information regarding the target image X. For example, each of the q functions may provide information about a single element of target image X without any significant distortion, i.e., $f_k(A_k)=a_{i,j}$ for some 1≤k≤L, 1≤i≤M, 1≤j≤N. One or more of the identity functions may be bijective functions, such as $f(x)=ax+b$, for positive and negative values of a. The term "identity" as used herein in this context is therefore intended to be broadly construed.

In step 316, the of q identity functions determined in step 314 are utilized to construct the initial approximation $X_0$ used in step 310. For example, interpolation may be applied using the q functions and their corresponding values in order to obtain an initial approximation $X_0$ of size M×N.

It is to be appreciated that the particular process steps used in the embodiments of FIGS. 2 and 3 are exemplary only, and other embodiments can utilize different types and arrangements of image processing operations. For example, the particular manner in which the functional is constructed, and the particular manner in which the target image is determined utilizing the functional, can be varied in other embodiments. Also, steps indicated as being performed serially in the figure can be performed at least in part in parallel with one or more other steps in other embodiments.

A number of examples will now be described in order to more fully illustrate image processing operations in certain embodiments of the invention. These examples generally involve image reconstruction using super resolution techniques adapted to utilize functionals and minimizations of the type described above.

In a first example, a target image is reconstructed using two images of the same type, namely, two depth images A and D, but with different resolutions. Let D be the smaller depth image of size MD×ND, and A be the larger depth image of size M×N. Assume for simplicity that the linear sizes of A are multiples of the correspondent sizes of D, i.e., there exists an integer SCALE such that M/MD=SCALE and N/ND=SCALE.

Also assume that the information from D is reliable concerning the values of pixels, and the information from A is reliable concerning the first discrete derivatives or gradients of the image, including knowledge about the sign of the gradient.

A depth image D1 of size M×N can be constructed using the following pseudocode:

```
for i = 1..M
    for j = 1..N
        if remainder(i/SCALE) == remainder(j/SCALE) == 0,
            then D1(i, j) = D(i/SCALE, j/SCALE);
            else D1(i, j) is indefinite;
    End
End
```

The desired target image in this example is a depth image X that will be close to D1 at the points where D1 is defined, and has vertical and horizontal gradients at all points that are close to vertical and horizontal gradients of A.

For any image of size M×N there are M·(N−1) horizontal gradients $a_{i,j+1} - a_{i,j}$ for all i=1 . . . M, j=1 . . . N−1, and (M−1)·N vertical gradients $a_{i+1,j} - a_{i,j}$ for all i=1 . . . M−1, j=1 . . . N. The functional can therefore be constructed as follows:

$$F(X) = w_1 \sum_{i=1}^{MD} \sum_{j=1}^{ND} (x_{i*SCALE, j*SCALE} - d_{i*SCALE, j*SCALE})^2 +$$

$$w_2 \sum_{i=1}^{M} \sum_{j=1}^{N-1} ((x_{i,j+1} - x_{i,j}) - (a_{i,j+1} - a_{i,j}))^2 + +$$

$$w_3 \sum_{i=1}^{M-1} \sum_{j=1}^{N} ((x_{i+1,j} - x_{i,j}) - (a_{i+1,j} - a_{i,j}))^2$$

In this example it is assumed that all probabilities are equal to 1, and further that only three different weights are used: weight $w_1$ for D1, weight $w_2$ for horizontal gradients and weight $w_3$ for vertical gradients.

As there are only linear functions such as gradients in this example, the resulting system of equations (3) will also be linear. Moreover, this system will have the form CX=b, where C is an MN×MN matrix. The matrix C is sparse, and more particularly comprises a 5-diagonal band matrix. Therefore, X can be found very efficiently using Gaussian elimination for band matrices, which takes only about min (MN³, M³N) arithmetic operations, as compared to about 2M³N³/3 arithmetic operations for simple Gaussian elimination.

The target image X is determined by solving the system of equations (3). If the result is not of sufficient quality, the weights $w_1$, $w_2$, $w_3$ can be adjusted in order to attempt to improve the quality of X.

In a second example, a target image is reconstructed using two images of different types, namely, a depth image and a 2D image comprising a photograph or infrared image of substantially the same scene. The first image will be referred to in the context of this example as "depth" and the second image as "photo." The two images may have different resolutions, and it should be noted in this regard that the depth image typically has much smaller resolution than the photo image. Accordingly, as in the previous example, let D be the smaller depth image of size MD×ND, and let A be the larger photo image of size M×N, and further assume for simplicity that the linear sizes of A are multiples of the correspondent sizes of D, i.e., there exists an integer SCALE such that M/MD=SCALE and N/ND=SCALE.

Also assume that the information from D is reliable concerning the values of pixels, and the information from A is reliable concerning the edges and borders of objects in the image, i.e., the absolute values of the gradients or first discrete derivatives of the image.

The depth image D1 of size M×N is constructed in the same manner as given by the pseudocode above.

The desired target image in this example is a depth image X that will be close to D1 at the points where D1 is defined, and has the absolute values of vertical and horizontal gradients at all points that are close to the absolute values of vertical and horizontal gradients of A.

Similar to the previous example, the functional can be constructed in the present example as follows:

$$F(X) = w_1 \sum_{i=1}^{MD} \sum_{j=1}^{ND} (x_{i*SCALE, j*SCALE} - d_{i*SCALE, j*SCALE})^2 +$$

$$w_2 \sum_{i=1}^{M} \sum_{j=1}^{N-1} (\text{abs}(x_{i,j+1} - x_{i,j}) - \text{abs}(a_{i,j+1} - a_{i,j}))^2 + +$$

$$w_3 \sum_{i=1}^{M-1} \sum_{j=1}^{N} (\text{abs}(x_{i+1,j} - x_{i,j}) - \text{abs}(a_{i+1,j} - a_{i,j}))^2$$

where abs(x) is the absolute value of x.

It should be noted that abs(x) is not a linear function, and so the system of equations (3) in this example will not be linear. Accordingly, the functional is instead minimized using approximate iterative minimization (4).

In the present example, D can be interpolated up to size M×N and used as the initial approximation $X_0$. The number q in this case will be MD·ND. For example, interpolation techniques such as nearest neighbor or bilinear interpolation can be used. Interpolated points can first be found between known points by rows, with the process being repeated to find additional interpolated points between known points by columns.

In a third example, the functional form used in the previous example may be varied as follows:

$$F(X) = w_1 \sum_{i=1}^{MD} \sum_{j=1}^{ND} (x_{i*SCALE, j*SCALE} - d_{i*SCALE, j*SCALE})^2 +$$

-continued $$w_2 \sum_{i=1}^{M} \sum_{j=1}^{N-1} ((x_{i,j+1} - x_{i,j}) - \text{sgn}_{(i,j) \to (i,j+1)} * \text{abs}(a_{i,j+1} - a_{i,j}))^2 + +w_3$$

$$\sum_{i=1}^{M-1} \sum_{j=1}^{N} ((x_{j+1,j} - x_{i,j}) - \text{sgn}_{(i,j) \to (i,j+1)} * \text{abs}(a_{i+1,j} - a_{i,j}))^2$$

where $\text{sgn}_{S \to T}(x)$ is an unknown constant equal to −1, 0 or 1 that corresponds to the sign of the corresponding gradient or discrete derivative of image X to be reconstructed at point S and in a direction towards point T, where T denotes a horizontal or vertical neighbor of point S.

As there are only linear functions in this example, the resulting system of equations (3) will also be linear. However, the constants $\text{sgn}_{S \to T}(x)$ are not known.

A number of different methods may be proposed for defining the constants $\text{sgn}_{S \to T}(x)$. For example, D can be interpolated up to size M×N and then signs of horizontal and vertical gradients of the interpolated image can be used as constants $\text{sgn}_{S \to T}(x)$. As another example, gradient signs can be locally reconstructed using exhaustive search by minimizing a functional $F(X_{M1,N1})$ where indices i and j from the above formula loop through local areas of the image, such as square sub-images $X_{M1,N1}$ of an initial input image, where 1<M1<M, 1<N1<N. If sub-image $X_{M1,N1}$ of size M1×N1 of image X is considered, one can solve $3^{2 \cdot M1 \cdot N1}$ systems of linear equations for each possible value of $2 \cdot M1 \cdot N1$ constants $\text{sgn}_{S \to T}(x)$ and select combinations of signs such that $F(X_{M1,N1})$ is minimized. The values of M1 and N1 will generally be very small, for example, both values could be equal to 2. After the constants $\text{sgn}_{S \to T}(x)$ are determined for all sub-images $X_{M1,N1}$, the constants may be averaged for all $\{X_{M1,N1}: x \in X_{M1,N1}\}$ so as to obtain the constants for the entire image.

It is to be appreciated that the above examples are presented by way of illustration only, and should not be construed as limiting the scope of any embodiment of the invention in any way.

The techniques described in the above examples may be used to improve performance of known super resolution techniques, as well as for a wide variety of other image reconstruction or image processing purposes.

For example, one such known super resolution technique may comprise a Markov random field based super resolution technique or another super resolution technique particularly well suited for reconstruction of depth information. Additional details regarding an exemplary Markov random filed based super resolution technique that may be adapted for use in an embodiment of the invention can be found in, for example, J. Diebel et al., "An Application of Markov Random Fields to Range Sensing," NIPS, MIT Press, pp. 291-298, 2005, which is incorporated by reference herein.

Embodiments of the invention may also be used to improve the performance of super resolution techniques based on bilateral filters. An example of a super resolution technique of this type is described in Q. Yang et al., "Spatial-Depth Super Resolution for Range Images," IEEE Conference on Computer Vision and Pattern Recognition (CVPR), 2007, which is incorporated by reference herein.

It should again be emphasized that the embodiments of the invention as described herein are intended to be illustrative only. For example, other embodiments of the invention can be implemented utilizing a wide variety of different types and arrangements of image processing circuitry, functional construction modules, target image generation modules, sets of functions, weights and probabilities, and processing operations than those utilized in the particular embodiments described herein. In addition, the particular assumptions made herein in the context of describing certain embodiments need not apply in other embodiments. These and numerous other alternative embodiments within the scope of the following claims will be readily apparent to those skilled in the art.

What is claimed is:

1. A method, comprising:
obtaining image information from one or more image sources, wherein the image information comprises a plurality of input images $A_1, A_2, \ldots, A_L$;
storing the image information in a memory;
constructing, with a processor, a functional based on a set of functions $f_1(A_1), f_2(A_2), \ldots, f_L(A_L)$ each comprising a function of pixels from a corresponding one of the input images $A_1, A_2, \ldots A_L$, wherein the functional comprises a functional F(X) that is a function of the set of functions $f_1(A_1), f_2(A_2), \ldots, f_L(A_L)$, wherein the functional F(X) is at least one of $$F(X) = \sum_{k=1}^{L} (f_k(X) - f_k(A_k))^2,$$

$$F(X) = \sum_{k=1}^{L} w_k (f_k(X) - f_k(A_k))^2, \text{ or}$$

$$F(X) = \sum_{k=1}^{L} w_k p_k (f_k(X) - f_k(A_k))^2,$$

where $w_k$ denotes a weight, $p_k$ denotes a probability, and where $w_k > 0$ and $0 \leq p_k \leq 1$ for all $k = 1 \ldots L$; and
generating, with a processor, a target image utilizing the constructed functional, wherein the target image comprises target image X of size M×N pixels to be reconstructed using the plurality of input images $A_1, A_2, \ldots, A_L$.

2. The method of claim 1 wherein at least one of the input images $A_1, A_2, \ldots, A_L$ is of size M×N pixels.

3. The method of claim 1, wherein the generating, with a processor, the target image X comprises determining X by minimizing the functional F(X).

4. The method of claim 1, wherein the functions $f_1(A_1), f_2(A_2), \ldots, f_L(A_L)$ are all linear functions.

5. The method of claim 4, wherein the generating, with a processor, the target image X comprises determining X by solving a system of linear equations comprising:

$dF/dx_{i,j} = 0$, for all $1 \leq i \leq M$, $1 \leq j \leq N$, where $x_{i,j}$ are pixel values of the target image X.

6. The method of claim 1, wherein at least one of the functions $f_1(A_1), f_2(A_2), \ldots, f_L(A_L)$ is a non-linear function.

7. The method of claim 6, wherein the generating, with a processor, the target image X comprises determining X based on an approximate iterative minimization:

$X_{i+1} = \text{app\_min}(F, X_i)$, which starts with an initial approximation $X_0$ and works iteratively until a maximum number of iterations is met or a difference between approximations $X_{i+1}$ and $X_i$, in two consecutive iterations is smaller than a threshold.

8. The method of claim 7, wherein the initial approximation $X_0$ is determined at least in part utilizing a set of q identity functions $f_{i1}(A_{i1}), f_{i2}(A_{i2}), \ldots, f_{iq}(A_{iq})$ each of which provides partial information regarding the target image.

9. The method of claim 8, wherein the identity functions each provide at least one pixel value $f_{i1}(A_{i1}) = a_{m1,n1}$, $f_{i2}$ $(A_{i2})=a_{m2,n2}, \ldots, f_{iq}(A_{iq})=a_{mq,nq}$, wherein the initial approximation $X_0$ is of size M×N, wherein the initial approximation $X_0$ is determined by interpolation using at least the q values $a_{m1,n1}, a_{m2,n2}, \ldots, a_{mq,nq}$.

10. The method of claim 1, wherein the image information comprises pixel information of at least one of:
   (i) first and second depth images of the same resolution;
   (ii) first and second depth images of different resolutions;
   (iii) a depth image and a non-depth image of the same resolution; and
   (iv) a depth image and a non-depth image of different resolutions.

11. The method of claim 1, wherein the plurality of input images $A_1, A_2, \ldots, A_L$ includes at least one of a two-dimensional image or a three-dimensional image.

12. The method of claim 11, wherein the plurality of input images $A_1, A_2, \ldots, A_L$ comprises at least one of a color image, a grayscale image, an infrared image, or a depth image.

13. An apparatus comprising:
   one or more processors configured to execute program instructions configured to cause the one or more processors to:
      obtain image information from one or more image sources, wherein the image information comprises a plurality of input images $A_1, A_2, \ldots, A_L$,
      store the image information in a memory,
      construct a functional based on a set of functions $f_1(A_1), f_2(A_2), \ldots, f_L(A_L)$ each comprising a function of pixels from a corresponding one of the input images $A_1, A_2, \ldots, A_L$, wherein the functional comprises a functional F(X) that is a function of the set of functions $f_1(A_1), f_2(A_2), \ldots, f_L(A_L)$, wherein the functional F(X) is at least one of $$F(X) = \sum_{k=1}^{L} (f_k(X) - f_k(A_k))^2,$$

$$F(X) = \sum_{k=1}^{L} w_k (f_k(X) - f_k(A_k))^2, \text{ or}$$

$$F(X) = \sum_{k=1}^{L} w_k p_k (f_k(X) - f_k(A_k))^2,$$

where $w_k$ denotes a weight, $p_k$ denotes a probability, and where $w_k>0$ and $0 \leq p_k \leq 1$ for all $k=1 \ldots L$; and
   generate a target image utilizing the constructed functional, wherein the target image comprises target image X of size M×N pixels to be reconstructed using the plurality of input images $A_1, A_2, \ldots, A_L$.

14. The apparatus of claim 13, wherein generating the target image X comprises determining X by minimizing the functional F(X).

15. The apparatus of claim 13, wherein the functions $f_1(A_1), f_2(A_2), \ldots, f_L(A_L)$ are all linear functions, wherein generate the target image X comprises determining X by solving a system of linear equations comprising:

$dF/dx_{i,j}=0$, for all $1 \leq i \leq M, 1 \leq j \leq N$, where $x_{i,j}$ are pixel values of the target image X.

16. The apparatus of claim 13, wherein at least one of the functions $f_1(A_1), f_2(A_2), \ldots, f_L(A_L)$ is a non-linear function.

17. The apparatus of claim 16, wherein generate the target image X comprises determining X based on an approximate iterative minimization:

$X_{i+1}=\text{app\_min}(F, X_i)$, which starts with an initial approximation $X_0$ and works iteratively until a maximum number of iterations is met or a difference between approximations $X_{i+1}$ and $X_i$, in two consecutive iterations is smaller than a threshold.

18. The apparatus of claim 17, wherein the initial approximation $X_0$ is determined at least in part utilizing a set of q identity functions $f_{i1}(A_{i1}), f_{i2}(A_{i2}), \ldots, f_{iq}(A_{iq})$ each of which provides partial information regarding the target image.

19. The apparatus of claim 18, wherein the identity functions each provide at least one pixel value $f_{i1}(A_{i1})=a_{m1,n1}, f_{i2}(A_{i2})=a_{m2,n2}, \ldots, f_{iq}(A_{iq})=a_{mq,nq}$, wherein the initial approximation $X_0$ is of size M×N, wherein the initial approximation $X_0$ is determined by interpolation using at least the q values $a_{m1,n1}, a_{m2,n2}, \ldots, a_{mq,nq}$.

20. An image processing system comprising:
   one or more image sources providing a plurality of input images $A_1, A_2, \ldots, A_L$;
   one or more image destinations; and
   one or more processors communicatively coupled to the one or more image sources and the one or more image destinations, the one or more processors configured to execute program instructions configured to cause the one or more processors to:
      obtain the plurality of input images $A_1, A_2, \ldots, A_L$ from the one or more image sources,
      store the plurality of input images $A_1, A_2, \ldots, A_L$ in a memory,
      construct a functional based on a set of functions $f_1(A_1), f_2(A_2), \ldots, f_L(A_L)$ each comprising a function of pixels from a corresponding one of the input images $A_1, A_2, \ldots, A_L$, wherein the functional comprises a functional F(X) that is a function of the set of functions $f_1(A_1), f_2(A_2), \ldots, f_L(A_L)$, wherein the functional F(X) is at least one of $$F(X) = \sum_{k=1}^{L} (f_k(X) - f_k(A_k))^2,$$

$$F(X) = \sum_{k=1}^{L} w_k (f_k(X) - f_k(A_k))^2, \text{ or}$$

$$F(X) = \sum_{k=1}^{L} w_k p_k (f_k(X) - f_k(A_k))^2,$$

where $w_k$ denotes a weight, $p_k$ denotes a probability, and where $w_k>0$ and $0 \leq p_k \leq 1$ for all $k=1 \ldots L$,
   generate a target image utilizing the constructed functional, wherein the target image comprises target image X of size M×N pixels to be reconstructed using the plurality of input images $A_1, A_2, \ldots, A_L$; and
   provide the target image to the one or more image destinations.

* * * * *